(No Model.)

C. J. LE ROY.
AUTOMATIC KNIFE GRINDER.

No. 348,753. Patented Sept. 7, 1886.

Attest:
J. W. E. Sanford
C. E. Hunt

Inventor:
Charles J. Le Roy
by C. D. Moody
atty

N. PETERS, Photo-Lithographer, Washington, D. C.

UNITED STATES PATENT OFFICE.

CHARLES J. LE ROY, OF ST. LOUIS, MISSOURI.

AUTOMATIC KNIFE-GRINDER.

SPECIFICATION forming part of Letters Patent No. 348,753, dated September 7, 1886.

Application filed July 10, 1884. Serial No. 147,363. (No model.)

*To all whom it may concern:*

Be it known that I, CHARLES J. LE ROY, of St. Louis, Missouri, have made a new and useful Improvement in Automatic Knife-Grinders, of which the following is a full, clear, and exact description, reference being had to the annexed drawings, making part of this specification, in which—

Figure 1:
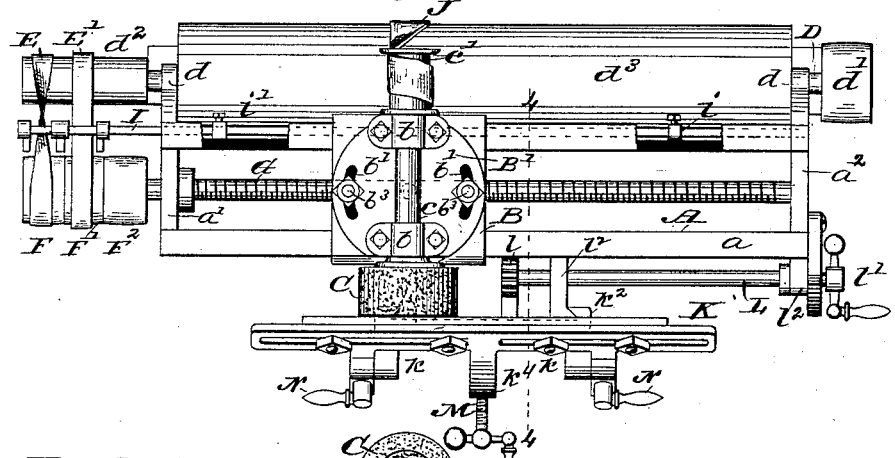
Figure 2:
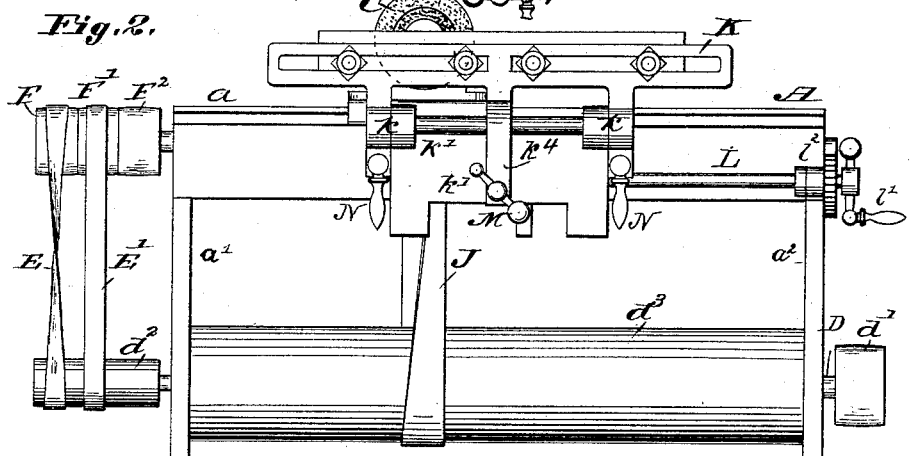
Figures 3, 4:
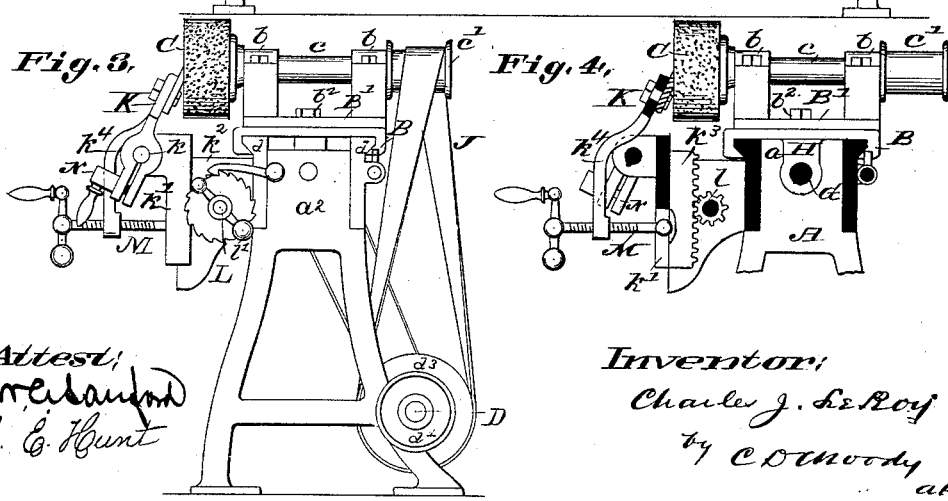

Figure 1 is a plan of the improved machine; Fig. 2, a side elevation thereof; Fig. 3, an end elevation thereof, and Fig. 4 a vertical cross-section on the line 4 4 of Fig. 1.

The same letters of reference denote the same parts.

A represents the frame of the machine. The frame consists substantially of the bed-plate $a$, supported upon suitable uprights, $a'$ $a^2$. A slide, B, rests and is adapted to be moved forward and backward upon the bed-plate $a$ from end to end thereof. The grinding-wheel C is attached to the shaft $c$, which in turn is held and adapted to be rotated in the bearings $b$ $b$ of the slide B.

D represents the main shaft. It is adapted to rotate in the bearings $d$ $d$ in the uprights $a'$ $a^2$. It is provided with the pulley $d'$, by means of which motion is communicated to the driving-shaft, and it is also provided with the wide pulley $d^2$ and with the elongated drum $d^3$. E E' represent belts leading from the wide pulley $d^2$ around the pulleys F F' F$^2$. These last-named pulleys are connected with the feed-shaft G. The middle pulley, F', is a loose pulley. The other pulleys, F F$^2$, are fastened to the feed-shaft. One, E, of the belts is crossed. Therefore the feed-shaft is rotated according to the position of the belts. If the belt E' is upon the loose pulley, as shown in Figs. 1, 2, the feed-shaft is driven in one direction by the belt E; but if the belts are shifted, so as to throw the belt E onto the loose pulley and the belt E' onto the fast pulley F$^2$, the feed-shaft is rotated in the opposite direction. The feed-shaft is threaded to engage in the nut H, which is attached to the slide B. By means of the feed-shaft then the slide B is caused to traverse the bed-plate to and fro. When the slide is moved far enough in one direction upon the bed-plate to encounter a projection, $i$, upon the belt-shifter I, the belt-shifter is caused to operate and shift the belts E E', causing the motion of the slide B to be reversed; and when the slide has moved back again in the opposite direction sufficiently to encounter the projection $i'$ of the belt-shifter the latter is moved in the opposite direction, and the belts E E' shift accordingly.

J represents a belt leading from the elongated drum $d^3$, around the pulley $c'$, upon the shaft $c$. By means of this belt the shaft $c$ and the grinding-pulley C are driven, and as the slide B is shifted to and fro upon the bed-plate the belt J is slipped accordingly upon the elongated drum $d^3$.

K represents the knife-holder. It extends parallel with the bed-plate of the machine, and it is capable of being adjusted vertically, and it can also be inclined toward and from the side of the grinding-wheel C. To this end the holder is journaled at $k$ $k$ to the frame $k'$. This frame in turn is adapted to be moved upward and downward in the guides $k^2$ upon the side of the bed-plate $a$. The frame is also provided with a rack, $k^3$. The rack engages with a pinion, $l$, that is attached to a shaft, L, which, by means of the crank $l'$, can be rotated in the bearings $l^2$, and according to the direction in which the shaft L is rotated the frame and knife-holder are raised or lowered. The knife-holder is also provided with the arm $k^4$, which extends downward from the holder, and at or toward its lower end engages with a screw, M. This screw passes through the arm $k^4$ and bears against the frame $k'$. By operating the screw M the knife-holder is caused to turn in the bearings $k$ $k$, and to cause the knife that is attached to the holder to be inclined accordingly to the grinding-wheel C. By means of the clamp-screws N N the holder can be clamped in the bearings $k$ $k$.

An important feature of the improvement is the provision by which the grinding-wheel C can be set so that its side shall be directly parallel with the knife being ground, or so that it can be inclined thereto, as desired—that is, when it is desired to grind a flat bevel the grinding-wheel C is set so that its outer side comes squarely against the knife, as shown in Fig. 1; and when it is desired to grind a concave bevel or surface the grinding-wheel is set so that its outer side shall be inclined to the knife—that is, so that the grinding-wheel shall stand cornerwise to the knife. To this end the upper portion, B', of the slide, and, being the portion which sustains the grinding-wheel, is pivoted at $b^2$ in the slide, so that the upper portion, B', can be turned horizontally around upon the lower portion of the slide, and when turned into the desired position the portion B' can by means of the bolts and nuts $b^3$, Fig. 1, be clamped to the lower portion of the slide. The portion B' is concentrically slotted at $b'$ to provide for the adjustment named.

An especial advantage is also derived from making the grinding-wheel movable in the manner described—that is, in place of attaching the grinding-wheel to the driving-shaft and causing it to traverse the shaft from end to end thereof the grinding-wheel is attached to a slide which moves forward and backward upon the rigid bed-plate $a$. The result accruing from this is the grinding-wheel and knife preserve a fixed relation to each other throughout the rectilinear motion of the grinding-wheel. In the construction alluded to a difference in the hardness of the knife being ground (that is, when a knife is hard and soft in spots) operates to alter the relation of the grinding-wheel to the knife, so that the knife in consequence is unevenly ground. In the present instance this difficulty is overcome in the manner described.

I claim—

1. The combination, in a knife-grinder, of the grinding-wheel C, the pivoted slide and support B', operated as described, and the knife-holder K, said grinding-wheel being adjustable to enable its outer side to be arranged parallel with or to be inclined to the knife, substantially as and for the purpose described.

2. The combination of the frame A, having the bed-plate $a$, the slide B, the pivoted upper portion, B', having concentric slots $b'$, the bolts and nuts $b^3$, the feed-shaft G, the projections $i\ i'$, the grinding-wheel C, and the knife-holder K, substantially as described.

3. The combination of the frame A, the main shaft D, the elongated drum $d^3$, the belt J, the pulley $c'$, the shaft $c$, the grinding-wheel C, the slide B, having the pivoted upper portion, B', provided with concentric slots $b'$, the bolts and nuts $b^3$, and the knife-holder K, journaled at $k$, and vertically adjustable and movable toward and from the grinding-wheel, substantially as described.

4. In a knife-grinding machine, the knife-holder K, made vertically adjustable, and also adjustable toward and from the side of the grinding-wheel, in combination with the grinding-wheel C, the pivoted and adjustable slide B, and the shaft G, substantially as described.

5. The combination of a frame, A, the slide B, the shaft $c$, the pulley $c'$, the grinding-wheel C, the knife-holder K, the pulleys $d'\ d^2$, the pulleys F F' F$^2$, the belts E E' J, the elongated drum $d^3$, the screw-shaft G, and the belt-shifter I, substantially as described.

CHARLES J. LE ROY.

Witnesses:
C. D. MOODY,
C. C. HUNT.